Oct. 3, 1961     D. M. VESPER ET AL     3,003,106
MEASUREMENT OF B.S. AND W. IN OIL

Filed March 17, 1958     3 Sheets-Sheet 1

INVENTORS
D. M. VESPER
R. W. MICHAEL
BY
*Hudson & Young*
ATTORNEYS

Oct. 3, 1961  D. M. VESPER ET AL  3,003,106
MEASUREMENT OF B.S. AND W. IN OIL
Filed March 17, 1958  3 Sheets-Sheet 3

INVENTORS
D.M. VESPER
R. W. MICHAEL
BY *Hudson & Young*
ATTORNEYS

United States Patent Office 3,003,106
Patented Oct. 3, 1961

3,003,106
MEASUREMENT OF B.S. AND W. IN OIL
Daniel M. Vesper and Richard W. Michael, Bartlesville, Okla., assignors to Phillips Petroleum Company, a corporation of Delaware
Filed Mar. 17, 1958, Ser. No. 721,726
9 Claims. (Cl. 324—61)

This invention relates to apparatus for measuring the amount of B.S. & W. (basic sediment and water) present in oil.

In the petroleum industry it is common practice to gather oil from a plurality of producing wells at a single location adjacent a pipeline. The oil is treated at this location to remove basic sediment and water, metered and transferred into the pipeline. Automatic custody transfer systems are presently being developed to carry out these operations with a minimum amount of supervision. In a gathering and transfer system of this type it is important that the B.S. & W. concentration in the oil delivered to the pipeline be maintained at less than a predetermined amount. The pipeline owner generally will not accept crude oil having a B.S. & W. concentration greater than a predetermined amount because of difficulties which may result due to the sediment and water settling out in storage tanks. Furthermore, the refiner who purchases the oil from the pipeline generally will not accept oil having B.S. & W. concentrations greater than a predetermined amount. Since one of the factors which affects the price of the oil is the B.S. & W. content, it is important to have a measurement of the amount of B.S. & W. in the delivered oil.

In accordance with the present invention, apparatus is provided which is capable of measuring continuously the amount of B.S. & W. present in crude oil to be delivered to a pipeline. This apparatus is based upon a measurement of the dielectric constant of the oil to determine the amount of B.S. & W. in the oil. If the measured B.S. & W. concentration should exceed a predetermined value, the delivery of oil is discontinued and the oil is transferred to a treating unit to remove additional amounts of B.S. & W. in order to maintain the B.S. & W. concentration in the delivered oil less than a predetermined value. Novel apparatus is provided in accordance with this invention for measuring continuously the B.S. & W. content of the oil. This measurement is made in terms of both the total B.S. & W. for a given time and the average B.S. & W. content.

Accordingly, it is an object of this invention to provide improved apparatus for measuring continuously the total concentration of B.S. & W. in oil.

Another object is to provide apparatus for measuring the average concentration of B.S. & W. in oil.

A further object is to provide novel recording apparatus.

Other objects, advantages and features of this invention should become apparent from the following detailed description which is taken in conjunction with the accompanying drawing in which.

Figure 1:
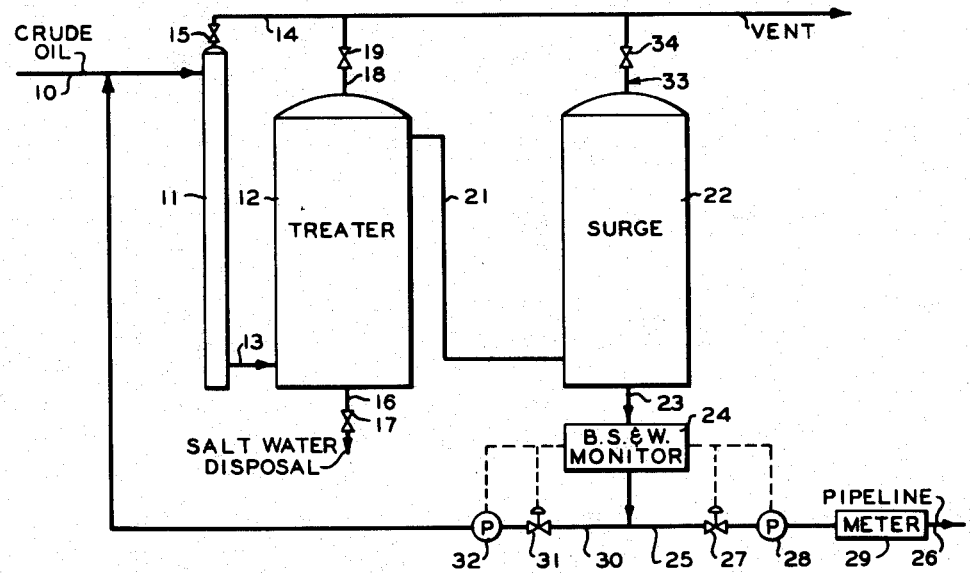
FIGURE 1 is a schematic representation of an oil treating and measuring unit having the monitoring and measuring system of the present invention incorporated therein.

Referring now to the drawing in detail and to FIGURE 1 in particular, there is shown a system for measuring and transmitting crude oil to a pipeline. The crude oil to be metered is delivered through an inlet conduit 10 which communicates with a vertical column 11. The lower region of column 11 communicates with a treater tank 12 through a conduit 13. Gases entrained in the crude oil are at least partially liberated in column 11 and are removed through a vent conduit 14 which has a valve 15 therein. Any B.S. & W. present in the crude oil tends to settle to the bottom of treater 12 and is removed therefrom through a conduit 16 which has a valve 17 therein. Treater 12 can be provided with a heating unit, not shown, to facilitate removal of B.S. & W. from the oil. Gases evolved from the oil in heater 12 are removed through a vent conduit 18 which has a valve 19 therein. The treated oil is removed from tank 12 through a conduit 21 which communicates with a surge tank 22. Any gases evolved from the oil in surge tank 22 are removed through a vent conduit 33 which has a valve 34 therein.

The oil in tank 22 is removed through a conduit 23 which has a B.S. & W. monitor 24 therein. Conduit 23 communicates with a conduit 25 which communicates with a pipeline 26. A control valve 27, a pump 28 and an oil meter 29 are disposed in conduit 25. Conduit 23 also communicates with a conduit 30 which communicates with oil inlet conduit 10. A control valve 31 and a pump 32 are disposed in conduit 30. As long as the B.S. & W. content of the oil removed from tank 22 is less than a predetermined value, valve 27 is open and pump 28 is energized to deliver oil to pipeline 26. Valve 31 is closed and pump 32 is deenergized at this time. If the B.S. & W. content of the oil should become excessive, valve 31 is opened, valve 27 is closed, pump 32 is energized and pump 28 is deenergized to terminate the flow of oil to pipeline 26 and to recirculate oil from surge tank 22 through treater 12.

Figure 2:
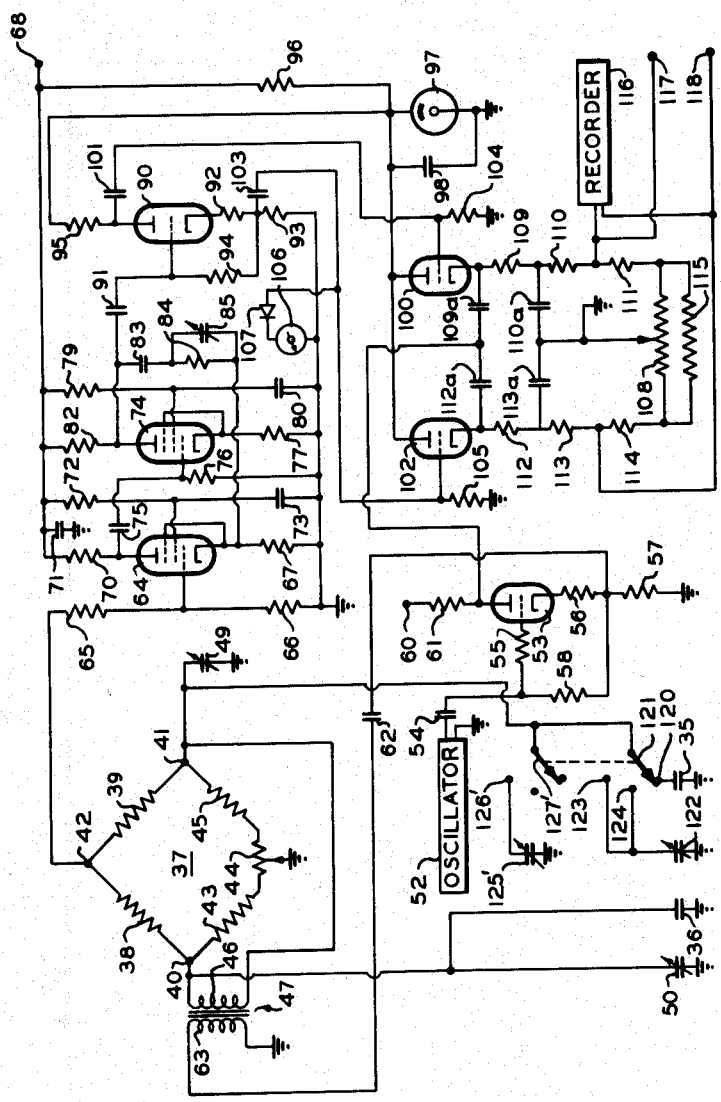
FIGURE 2 is a schematic circuit drawing of the dielectric constant measuring apparatus employed in the monitoring and control system.

Monitor 24 measures the B.S. & W. concentration by measuring the dielectric constant of the oil circulated through the monitor. A capacitor 35, see FIGURE 2, is disposed within the flow of oil so that the oil forms the dielectric thereof. The capacitance of capacitor 35 is compared with the capacitance of a reference capacitor 36 which has clean dry oil forming the dielectric thereof. The measuring apparatus comprises a bridge network 37 which has resistors 38 and 39 connected in series relationship between first and second opposite terminals 40 and 41. The junction between resistors 38 and 39 is designated as terminal 42. A resistor 43, a potentiometer 44 and a resistor 45 are connected in series relationship between terminals 40 and 41. The contactor of potentiometer 44 is connected to ground. The secondary winding 46 of a transformer 47 is connected across bridge terminals 40 and 41. Capacitor 35 is connected between terminal 41 and ground, and capacitor 36 is connected between terminal 40 and ground. Variable adjusting capacitors 49 and 50 are connected in parallel with respective capacitors 35 and 36.

Transformer 47 is energized from the output of an oscillator 52. The first output terminal of oscillator 52 is connected to the control grid of a triode 53 through a capacitor 54 and a resistor 55 which are connected in series relationship. The cathode of triode 53 is connected to ground through series connected resistors 56 and 57. The junction between resistor 55 and capacitor 54 is connected to the junction between resistors 56 and 57 by a resistor 58. The anode of triode 53 is connected to a positive potential terminal 60 through a resistor 61. The junction between resistors 56 and 57 is connected through a capacitor 62 to one terminal of the primary winding 63 of transformer 47. The second terminal of transformer winding 63 is connected to ground.

Output terminal 42 of bridge network 37 is connected to the control grid of a pentode 64 through a resistor 65. The control grid of pentode 64 is connected to ground through a resistor 66. The cathode and suppressor grid of pentode 64 are connected to ground through a resistor 67. The anode of pentode 64 is connected to a positive potential terminal 68 through a resistor 70. A capacitor 71 is connected between terminal 68 and ground. The screen grid of pentode 64 is connected to terminal 68 through a resistor 72 and to ground through a capacitor 73. The anode of pentode 64 is also connected to the control grid of a pentode 74 through a capacitor 75. A resistor 76 is connected between the control grid of pentode 74 and ground. The cathode and suppressor grid of pentode 74 are connected to ground through a resistor 77. The screen grid of pentode 74 is connected to terminal 68 through a resistor 79 and to ground through a capacitor 80. The anode of pentode 74 is connected to terminal 68 through a resistor 82.

The anode of pentode 74 is also connected to the cathode of pentode 64 through a feedback network which comprises a capacitor 83 and a resistor 84 that are connected in series relationship. A variable capacitor 85 is connected in parallel with resistor 84 to change the phase of the feedback signal.

The anode of pentode 74 is connected to the control grid of a triode 90 through a capacitor 91. The cathode of triode 90 is connected to ground through series connected resistors 92 and 93. The control grid of triode 90 is connected to ground through series connected resistors 94 and 93. The anode of triode 90 is connected to terminal 68 through series connected resistors 95 and 96. A voltage regulating tube 97 is connected between ground and the junction between resistors 95 and 96, and a capacitor 98 is connected in parallel with this tube.

The anode of triode 90 is also connected to the control grid of a triode 100 through a capacitor 101. The junction between resistors 92 and 93 is connected to the control grid of a triode 102 through a capacitor 103. The control grids of triodes 100 and 102 are connected to ground through respective resistors 104 and 105. A null detecting meter 106 is connected between ground and the grid of triode 102 through a rectifier 107. The anodes of triodes 100 and 101 are connected to one another and to terminal 68 through resistor 96. The cathode of triode 100 is connected to the first end terminal of a potentiometer 108 through series connected resistors 109, 110 and 111. The cathode of triode 102 is connected to the second end terminal of potentiometer 108 through series connected resistors 112, 113 and 114. The contactor of potentiometer 108 is connected to ground. A resistor 115 is connected in parallel with potentiometer 108. The junction between resistors 110 and 111 is connected to the first input terminal of a recorder 116, and the junction between resistors 113 and 114 is connected to the second input terminal of recorder 116. The anode of triode 53 is connected to the cathodes of triodes 100 and 102 through respective capacitors 109a and 112a. A capacitor 110a is connected between ground and the junction between resistors 109 and 110, and a capacitor 113a is connected between ground and the junction between resistors 112 and 113.

The operation of the apparatus of FIGURE 2 will now be described. The output of oscillator 52 is applied through cathode follower 53 and transformer 47 across terminals 40 and 41 of bridge network 37. It should be evident that this network forms a capacity bridge. If the bridge is balanced there is a zero potential difference between terminal 42 and the grounded contactor of potentiometer 44. However, any unbalance of the bridge due to a change in capacitance of element 35 results in the potential at terminal 42 changing from ground potential. Also, any unbalance in the resistance arm including resistor 43, potentiometer 44 and resistor 45 or any change in the loss factor of the material in condenser 35 results in the potential at terminal 42 changing from ground potential. This latter potential is 90° out of phase with the potential due to a change in capacitance of condenser 35. This potential is applied to the grid of pentode 64. Any unbalance signal is amplified by pentodes 64 and 74 and applied to the control grid of triode 90. Triode 90 provides two output signals which are 180° out of phase with one another. These two signals are applied to the control grids of triodes 100 and 102, respectively. Triodes 100 and 102 and the associated circuit form a phase sensitive detector. A reference signal is applied to the cathode of these tubes from the output of triode 53. The two signals applied to the phase detector network are thus of the same frequency because they are both obtained from oscillator 52. The currents through the two triodes are functions of the amplitudes of the signals applied to the control grids and the phases of these signals with respect to the reference signal applied to the cathodes. The resistors and capacitors in the cathode circuits of the two triodes filter the currents through the triodes. If the capacitance of capacitor 35 should become greater than that of capacitor 36, bridge network 37 is unbalanced in a first direction. If the capacitance of capacitor 35 becomes less than that of capacitor 36 the bridge is unbalanced in the opposite direction. The phase of the output signal from the bridge thus changes by 180° when the direction of the unbalance changes.

Bridge network 37 is balanced initially by varying one or both of capacitors 49 and 50 and/or potentiometer 44 until the recorder reads zero, or a predetermined value as determined by the setting of the contactor of potentiometer 108, when a reference material is disposed between the plates of capacitor 35. The contactor of potentiometer 44 alone is then moved to determine if the signal applied to recorder 116 changes. If a change is observed, capacitor 85 is varied to change the phase of the signal applied to the control grid of triode 90. Adjustment of capacitor 85 is continued to restore the recorder to the initial value. The contactor of potentiometer 44 is then adjusted until the reading of meter 106 is zero, which indicates that there is a zero potential difference between bridge terminal 42 and ground. At this final point, any further change of the position of the contactor of potentiometer 44 does not change the recorder reading. The bridge circuit is then balanced and the apparatus is ready to be operated. Any change in capacitance of capacitor 35 results in a change in the signal applied to recorder 116.

Capacitor 35 is connected to a terminal 120 which is adapted to be engaged by a switch 121. Switch 121 is connected to bridge terminal 41. A variable capacitor 122 is connected between ground and terminals 123 and 124. These two terminals are also adapted to be engaged selectively by switch 121. A variable capacitor 125' is connected between ground and a terminal 126'. Terminal 126' is engaged by a switch 127' when terminal 123 is engaged by switch 121. Switch 127' is also connected to bridge terminal 41. The zero point of the capacitance bridge measuring circuit can be checked by moving switch 121 into engagement with terminal 124. This connects capacitor 122 into the measuring circuit in place of capacitor 35. Capacitor 122 is selected so that the output signal of the measuring circuit is zero if the circuit is operating properly. When switches 121 and 127' are moved into engagement with respective terminals 123 and 126', capacitor 125' is connected in parallel with capacitor 122. Capacitor 125' is selected so that the output signal of the bridge network has a predetermined value if the measuring circuit is operating properly.

Figure 3:
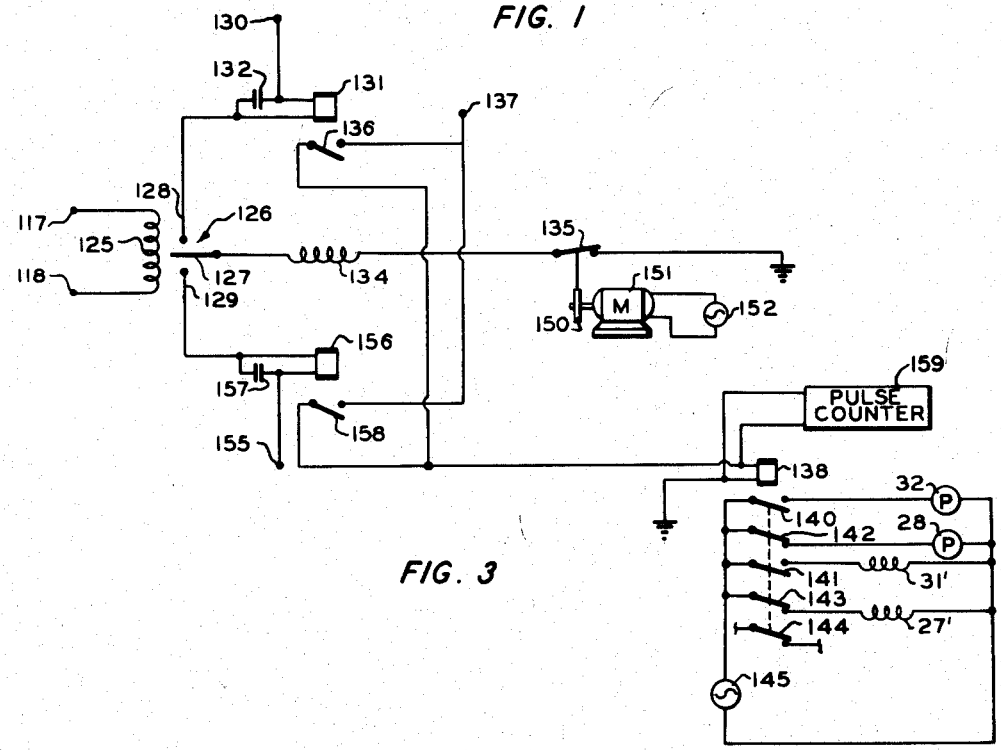
FIGURE 3 is a schematic circuit drawing of the control system of FIGURE 1.

The output signal from the measuring circuit of FIGURE 2 energizes the control circuit of FIGURE 3. Terminals 117 and 118 of FIGURE 2 are connected to the respective end terminals of the coil 125 of a relay 126. Relay 126 is provided with a rotatable arm 127 which engages a first stationary contact 128 in a first position and a second stationary contact 129 in a second position. When the B.S. & W. content of the oil stream exceeds a predetermined value, the signal applied to coil 125 moves arm 127 into engagement with contact 128. Contact 128 is connected to a potential terminal 130 through a relay coil 131. A capacitor 132 is connected in parallel with relay coil 131. Arm 127 of relay 126 is connected to ground through a latching coil 134 and a switch 135. When arm 127 engages contact 128, relay coil 131 is energized to close a switch 136 and latching coil 134 is energized to retain arm 127 in this position. Switch 136 is connected between a potential terminal 137 and the first terminal of a relay coil 138. The second terminal of relay coil 138 is connected to ground. When relay coil 138 is energized, switches 140 and 141 are closed and switches 142, 143 and 144 are opened. Pumps 28 and 32 of FIGURE 1 are connected to a source of electrical energy 145 through respective switches 142 and 140. When the measured B.S. & W. content exceeds a predetermined value, switch 140 is closed and switch 142 is opened. This energized pump 32 and deenergizes pump 28.

Valves 27 and 31 are opened when respective solenoids 27' and 31' are energized. These solenoids are connected to source 145 through respective switches 143 and 141. Valve 27 is thus closed when pump 28 is stopped, and valve 31 is opened when pump 32 is started. Switch 144 is described hereinafter.

Switch 135 is controlled by a cam 150 which is rotated by a constant speed motor 151, the latter being energized by a source of current 152. Cam 150 is designed so that switch 135 is opened momentarily, three seconds for example, at the end of predetermined intervals, such as 15 seconds, for example. If the measured B.S. & W. content still exceeds the predetermined set value at the time switch 135 is opened, arm 127 remains in engagement with contact 128. If the measured B.S. & W. content is within accepted limits, the opening of switch 135 permits arm 127 to move out of engagement with contact 128 because holding coil 134 is deenergized. Capacitor 132 provides current to retain relay 131 closed during the interval that switch 135 is open. Relay 138 is provided with a time delay in closing, 30 seconds for example. This prevents the control circuit from operating in the event the measured B.S. & W. content exceeds the set value for only a few seconds.

Contact 129 is connected to a potential terminal 155 through a relay coil 156. A capacitor 157 is connected in parallel with relay coil 156. Relay coil 156 closes a switch 158 when energized. Switch 158 is connected in parallel with switch 136. If the electronic measuring circuit should fail for any reason, the signal applied to coil 125 is such as to move switch arm 127 into engagement with contact 129. This is a "fail-safe" circuit and operates to prevent oil from being delivered to the pipeline in the event the monitor fails to operate properly. A pulse counter 159 is connected in parallel with relay coil 138 so as to be energized each time relay 138 is energized. This provides the operator with an indication of how effectively treater 12 is operating.

Figure 4:
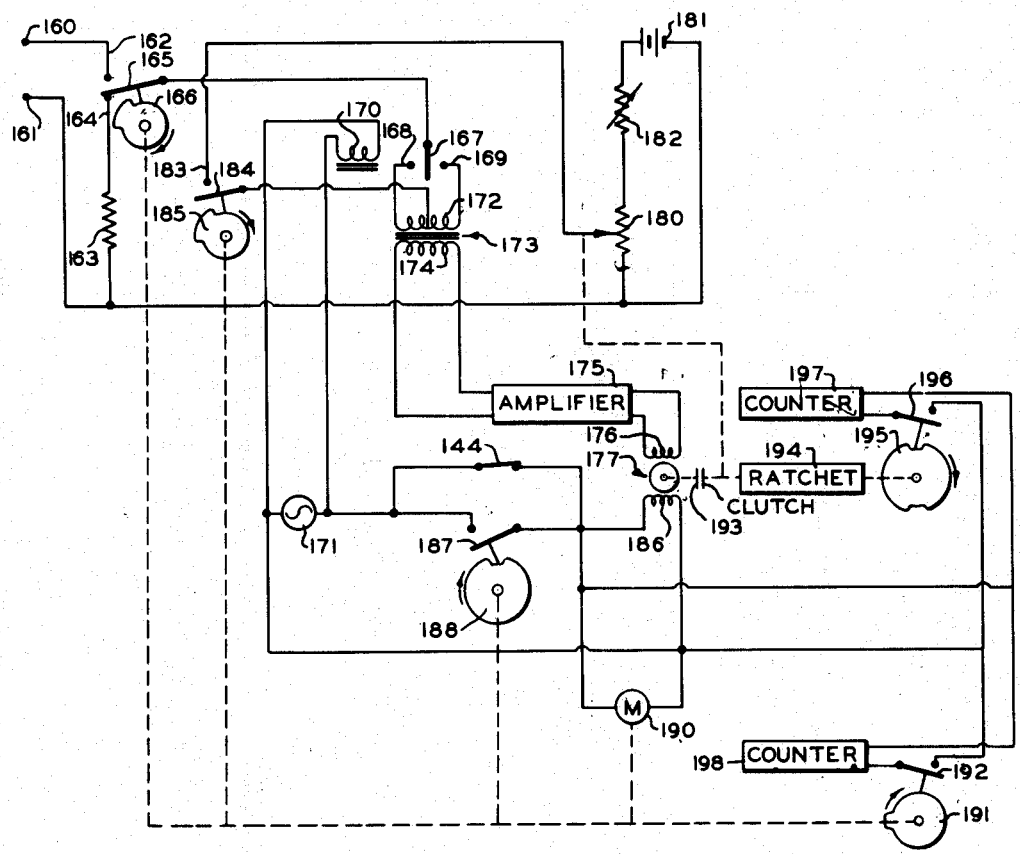
FIGURE 4 is a schematic circuit drawing of the total B.S. & W. recording system of this invention.

Recorder 116 is illustrated in FIGURE 4. The first input terminal 160 is connected to a terminal 162, and the second input terminal 161 is connected through a resistor 163 to a terminal 164 which is spaced from terminal 162. A switch 165 is moved by a cam 166 to engage terminals 162 and 164 selectively. Switch 165 is connected to a switch 167 which is adapted to engage spaced contacts 168 and 169 alternately. Switch 167 is moved between these contacts by means of a coil 170 which is energized by a source of alternating current 171. Contacts 168 and 169 are connected to the respective end terminals at primary winding 172 of a transformer 173. The end terminals of secondary winding 174 of transformer 173 are connected to the respective input terminals of an amplifier 175. The output terminals of amplifier 175 are connected to the respective end terminals of the first winding 176 of a reversible motor 177.

Input terminal 161 is also connected to the first end terminal of a potentiometer 180 and to one terminal of a voltage source 181. The second end terminal of potentiometer 180 is connected through a variable resistor 182 to the second terminal of voltage source 181. The contactor of potentiometer 180 is connected to a stationary contact 183 that is adapted to be engaged by a switch 184 which is moved by a cam 185. Switch 184 is connected to the center tap of transformer winding 172.

One terminal of the second winding 186 of motor 177 is connected to one terminal of current source 171. The second terminal of motor winding 186 is connected to the second terminal of current source 171 through switch 144 which is actuated by relay 138 of FIGURE 3. A switch 187 is connected in parallel with switch 144. Switch 187 is actuated by a cam 188. A constant speed timing motor 190 is connected in parallel with motor coil 186. Motor 190 rotates cams 166, 185, 188 and a fourth cam 191 which is adapted to actuate a switch 192. The drive shaft of motor 177 is connected through a clutch 193 to the contactor of potentiometer 180. The drive shaft of motor 177 is also connected through clutch 193 and a ratchet 194 to a fifth cam 195. Cam 195 is adapted to actuate a switch 196. One terminal of current source 171 is connected through switch 144 to the first terminals of respective counters 197 and 198. The second terminal of current source 171 is connected through respective switches 196 and 192 to the second terminals of counters 197 and 198.

If the output signal from monitor 24 is less than a predetermined value, relay 138 of FIGURE 3 remains deenergized so that switch 144 is closed. Timing motor 190 of FIGURE 4 is thus energized by current source 171. Motor 190 rotates cam 185 to close switch 184 so that the center tap of transformer winding 172 is connected to the contactor of potentiometer 180. Cam 166 is rotated to move switch 165 into engagement with contact 162 at substantially the same time. The input direct voltage applied between terminals 160 and 161 is thus converted into an alternating signal by means of vibrating switch 167. This signal is amplified to drive motor 177 in a direction to adjust the contactor of potentiometer 180 until the input signal applied to amplifier 175 is zero. The rotation of motor 177 required to establish this balanced condition is recorded on counter 197 by means of cam 195. This cam closes switch 196 a number of times that is representative of the rotation of motor 177. Counter 197 preferably is an instrument which records this information as a digital representation. During this same period of time, cam 191 closes switch 192 once so that a single pulse is applied to counter 198.

After the servo system has had time to reach a point of balance, cam 166 moves switch 165 into engagement with contact 164 so that the input signal is no longer applied to transformer 173. At this time, motor 177 rotates in the opposite direction to return the contactor of potentiometer 180 to the initial "zero" position. Cam 195 is not rotated because of ratchet 194. Cam 185 then opens switch 184 so that the system remains deenergized until the next sampling period.

In the event the B.S. & W. content of the oil exceeds a predetermined value, the oil is no longer delivered to pipeline 26 and relay 138 of FIGURE 3 is energized so that switch 144 is opened. At the end of the current sampling period, cam 188 opens switch 187 so that both timing motor 190 and servo motor 177 are deenergized. The recorder of FIGURE 4 thus remains deenergized until such time as the oil is again delivered to pipeline 26 and switch 144 is closed. Meter 29 of FIGURE 1 can be a tank of predetermined volume which fills and is then emptied. Cam 188 can be designed so that switch 187 remains open until switch 144 closes again to energize timing motor 190. The recorder is then activated for one sampling period of switch 144 remains closed.

At any given time, counter 197 indicates the total B.S. & W. content of the oil measured during all of the sampling periods. Counter 198 indicates the total number of sampling periods. In order to obtain the average B.S. & W. content of the oil, the reading of counter 197 is divided by the reading of counter 198. This division can be accomplished by an operator or automatically by means of the apparatus illustrated in FIGURE 5. A voltage source 200 is connected across the end terminals of a potentiometer 201. The first end terminal of potentiometer 201 is connected to the first end terminal of a second poteniometer 202. The contactor of potentiometer 201 is connected to the contactor of potentiometer 202 through a current indicator 203. A recorder 204 is connected across indicator 203. The contactor of potentiometer 201 is mechanically connected to counter 197 so that this contactor moves upwardly by an amount representative of the number of pulses applied to counter 197. The contactor of potentiometer 202 is similarly connected to counter 198.

Figure 5:
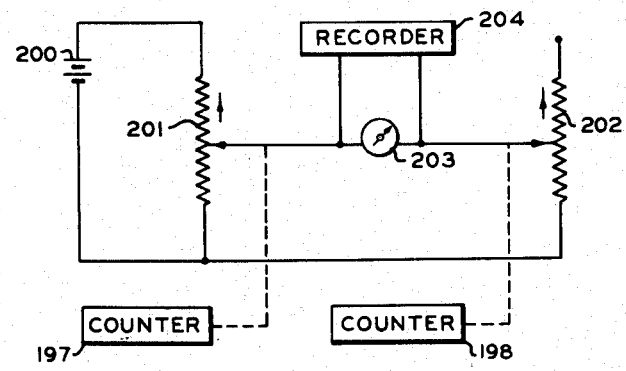
FIGURE 5 is a schematic circuit drawing of the average B.S. & W. recording system of this invention.

The current through indicator 203 of FIGURE 5 is representative of the desired quotient. The resistance of potentiometer 202 should be substantially higher than the resistance of potentiometer 201 in order to reduce the potentiometer loading effect. The average reading is then obtained by a substitution for Ohm's law:

$$\text{Average} = \frac{\text{Voltage at the contactor of potentiometer 201}}{\text{Resistance of potentiometer 202 in the circuit}}$$

Any small error which is introduced by the resistance of indicator 203 and the input resistance of recorder 204 is negligible after a few readings have been applied to counters 197 and 198.

The apparatus of FIGURES 4 and 5 thus provides a convenient measurement of the average B.S. & W. content of the oil delivered to a pipeline. This apparatus provides both an indication of the average B.S. & W. content of the delivered oil and the total B.S. & W. content for any given number of sampling intervals. These readings can readily be observed by operators in the field.

While the invention has been described in conjunction with a present preferred embodiment, it should be evident that it is not limited thereto.

What is claimed is:

1. Apparatus for measuring the B.S. & W. content of oil comprising a capacitor adapted to have the oil to be measured disposed between the plates thereof to form the dielectric, means connected to said capacitor to establish an electrical signal representative of the capacitance of said capacitor, a first recorder, a second recorder, timing means to apply said electrical signal to said first recorder at predetermined time intervals so that said first recorder indicates the sum of said signals applied during said timing intervals, and means responsive to said timing means to energize said second recorder each interval at which said signals are applied to said first recorder so that said second recorder indicates the number of times signals are applied to said first recorder.

2. Apparatus for measuring the B.S. & W. content of oil comprising a capacitor adapted to have the oil to be measured disposed between the plates thereof to form the dielectric, means connected to said capacitor to establish an electrical signal representative of the capacitance of said capacitor, a first recorder, a second recorder, a source of energy to actuate said recorders, a motor, timing means to energize said motor responsive to said electrical signal at predetermined intervals, means controlled by said motor to apply said source of energy to said first recorder, and means responsive to said timing means to apply said source of energy to said second recorder each time said motor is energized.

3. Apparatus for measuring the B.S. & W. content of oil comprising a capacitor adapted to have the oil to be measured disposed between the plates thereof to form the dielectric, means connected to said capacitor to establish an electrical signal representative of the capacitance of said capacitor, a first electrically operated counter, a second electrically operated counter, a timing motor, a second motor, means controlled by said timing motor to energize said second motor at predetermined intervals by said electrical signal, a source of electrical energy, first switching means to connect said source of electrical energy to said first counter, means responsive to said second motor to close said first switching means a number of times representative of the magnitude of said signal, second switching means to connect said source of electrical energy to said second counter, and means responsive to said timing means to close said second switching means each time said second motor is energized.

4. The apparatus of claim 3 further comprising means to divide the reading of said first counter by the reading of said second counter to provide a signal representative of the average B.S. & W. content of the measured oil.

5. The apparatus of claim 2 wherein said means to divide comprises a potentiometer, a voltage source applied across the end terminals of said potentiometer, a variable resistance having one terminal connected to the first end terminal of said potentiometer, current indicating means connected between the contactor of said potentiometer and the second terminal of said resistance, means responsive to the signals applied to said first counter to move the contactor of said potentiometer to increase the voltage between said contactor and said first end terminal, and means responsive to the signals applied to said second counter to increase said variable resistance, said current indicating means indicating the desired quotient.

6. Apparatus for measuring the B.S. & W. content of oil comprising a capacitor adapted to have the oil to be measured disposed between the plates thereof to form the dielectric, means connected to said capacitor to establish an electrical signal representative of the capacitance of said capacitor, a first electrically operated counter, a second electrically operated counter, a timing motor, a second two phase motor, a source of reference potential, means to compare said reference potential with said electrical signal and to apply the difference to the first input of said second motor, means responsive to said timing motor to energize the second input of said second motor at predetermined intervals, means responsive to said second motor to adjust said reference potential to terminate rotation of said second motor, a source of electrical energy, first switching means to connect said source of electrical energy to said first counter, means responsive to said second motor to close said first switching means a number of times representative of the rotation of said second motor, second switching means to connect said source of electrical energy to said second counter, and means responsive to said timing means to close said second switching means each time said second motor is energized.

7. Apparatus for use in obtaining the average value of a plurality of electrical signals comprising a first recorder, a second recorder, timing means to apply said signals to said first recorder at predetermined time intervals so that said first recorder indicates the sum of the signals applied thereto, means responsive to said timing means to energize said second recorder each interval at which said signals are applied to said first recorder so that said second recorder indicates the number of times signals are applied to said first recorder, and means responsive to said first and second recorders to divide the reading of said first recorder by the reading of said second recorder to provide a signal representative of the average value of said electrical signals.

8. The apparatus of claim 7 wherein said means to divide comprises a potentiometer, a voltage source applied across the end terminals of said potentiometer, a variable resistance having one terminal connected to the first end terminal of said potentiometer, current indicating means connected between the contactor of said potentiometer and the second terminal of said resistance, means responsive to the signals applied to said first recorder to move the contactor of said potentiometer to increase the voltage between said contactor and said first end terminal, and means responsive to the signals applied to said second recorder to increase said variable resistance, said current indicating means indicating the desired quotient.

9. Apparatus for use in obtaining the average value of a plurality of electrical signals comprising a first electrically operated counter, a second electrically operated counter, a timing motor, a second motor, means controlled by said timing motor to energize said second motor at predetermined intervals in response to said electrical signals, a source of electrical energy, first switching means to connect said source of electrical energy to said first counter, means responsive to said second motor to close said first switching means a number of times representative of the magnitude of said signals, second switching means to connect said source of electrical energy to said second counter, and means responsive to said timing means to close said second switching means each time said second motor is energized.

References Cited in the file of this patent

UNITED STATES PATENTS

| | | |
|---|---|---|
| 2,535,027 | Anderson | Dec. 26, 1950 |
| 2,577,612 | Fay | Dec. 4, 1951 |
| 2,607,830 | Razek | Aug. 19, 1952 |
| 2,617,299 | Ennis et al. | Nov. 11, 1952 |
| 2,795,758 | Cahn | June 11, 1957 |
| 2,826,738 | Lupfer et al. | Mar. 11, 1958 |
| 2,833,469 | Groth | May 6, 1958 |

OTHER REFERENCES

Stern: "General Purpose Integrator for Data Reduction," Instruments and Automation, volume 30, February 1957; pp. 254–255.